(12) United States Patent
Kusuda et al.

(10) Patent No.: US 6,559,902 B1
(45) Date of Patent: May 6, 2003

(54) TOUCH PANEL

(75) Inventors: Yasuji Kusuda, Kyoto (JP); Jun Shimizu, Kyoto (JP); Shinya Yamada, Kyoto (JP); Takao Hashimoto, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 09/623,981

(22) PCT Filed: Jan. 12, 2000

(86) PCT No.: PCT/JP00/00097
§ 371 (c)(1),
(2), (4) Date: Sep. 11, 2000

(87) PCT Pub. No.: WO00/42496
PCT Pub. Date: Jul. 20, 2000

(30) Foreign Application Priority Data

Jan. 12, 1999 (JP) .............................. 11-005142

(51) Int. Cl.[7] .............................................. G02F 1/1335
(52) U.S. Cl. ............................................................ 349/12
(58) Field of Search ............................. 349/12; 345/173, 345/174

(56) References Cited

U.S. PATENT DOCUMENTS

| | | | | |
|---|---|---|---|---|
| 4,527,862 A | * | 7/1985 | Arakawa ..................... 349/12 |
| 5,541,370 A | * | 7/1996 | Matsuda et al. ............... 349/12 |
| 5,844,175 A | * | 12/1998 | Nakanishi et al. ............. 349/12 |
| 6,016,134 A | * | 1/2000 | Ota .............................. 349/12 |
| 6,118,889 A | * | 9/2000 | Izuno et al. ................... 349/12 |
| 6,310,614 B1 | * | 10/2001 | Maeda et al. ................. 349/12 |
| 6,329,044 B1 | * | 12/2001 | Inoue et al. ................... 349/12 |

FOREIGN PATENT DOCUMENTS

| | | |
|---|---|---|
| JP | 5-338086 | 12/1993 |
| JP | 6-275132 | 9/1994 |
| JP | 6-309101 | 11/1994 |
| JP | 6-309990 | 11/1994 |
| JP | 11-297160 | 10/1999 |

* cited by examiner

Primary Examiner—James Dudek
(74) Attorney, Agent, or Firm—Wenderoth, Lind & Ponack, L.L.P.

(57) ABSTRACT

An upper electrode sheet having a transparent electrode formed on a transparent film of polyethylene terephthalate and a lower electrode sheet having a transparent electrode formed on a transparent film of polycarbonate are arranged opposite to each other via a plurality of spacers of an insulating substance between the electrodes, with a transparent hold plate of a polycarbonate plate being bonded over an entire face to a lower face of the lower electrode sheet via a transparent adhesion layer.

29 Claims, 2 Drawing Sheets

TOUCH PANEL

TECHNICAL FIELD

The present invention relates to a touch panel placed on a screen of display devices such as LCDs (liquid crystal displays), CRTs (cathode ray tubes), or the like with which position input is obtained by being depressed from above by a finger or pen in accordance with instructions on the seen-through screen.

BACKGROUND ART

Conventionally, as shown in FIG. 4, a transparent touch panel of a resistance film system is so constructed that a pair of an upper electrode sheet 101 and a lower electrode sheet 102 having transparent electrodes of ITO or the like on transparent films respectively are arranged opposite to each other via spacers 103 of an insulating substance between the electrodes, and a transparent hold plate 105 of a resin totally is bonded to a lower face of the lower electrode sheet 102 via a transparent adhesive layer 104 (referring to FIG. 5).

For the transparent films of the upper electrode sheet 101 and the lower electrode sheet 102, a polyethylene terephthalate-film of a thickness of 100–200 μm superior in flexibility to pressing at the input time is used, which is generally biaxially stretched. For the transparent hold plate 105, a polycarbonate plate of a thickness of 0.5–3.0 mm with a superior rigidity for protecting a screen of an LCD or the like from pressing at the input time is used, which is generally unstretched.

The polyethylene terephthalate film used for the transparent film of the lower electrode sheet 102 and the polycarbonate plate used for the transparent hold plate 105 are different in thermal expansion coefficient, and moreover the former is stretched whereas the latter is unstretched. The transparent film of the lower electrode sheet 102 is bonded totally, that is, over the entire face to the transparent hold plate 105. As such, the transparent hold plate 105 changes differently in size between the side of the lower electrode sheet and the opposite side when the touch panel is exposed to a severe temperature environment or humidity environment. The touch panel sometimes warps to project upward at its central part (with reference to FIG. 5). This warp produces an air layer between the touch panel and the screen under the touch panel, whereby a sense of touch in operation is dulled because of an unnecessary deflection applied to the whole of the touch panel at the input time.

The warp could be forcibly corrected to make the touch panel flat in setting the touch panel on the screen of the LCD, CRT, or the like. This, however, leads to waving the transparent film of the upper electrode sheet 101 and worsening an appearance or look of the touch panel and a visibility of the screen. The waving of the transparent film of the upper electrode sheet 101 changes a gap between electrodes irregularly, consequently varying the sense of touch depending on spots of the touch panel. An insulation failure may also be brought about through mutual touch of the electrodes if the waving of a large size takes place.

An object of the present invention is therefore to provide a touch panel superior in flexibility for a pressing operation at the input time and rigidity for protecting a screen of a display device such as an LCD, CRT, or the like from the pressing operation, which hardly warps even exposed to a severe temperature environment or humidity environment, with solving the above-described issues.

DISCLOSURE OF INVENTION

In order to accomplish the above object, the present invention is so constructed as follows.

According to a first aspect of the present invention, there is provided a touch panel in which an upper electrode sheet having an upper transparent electrode formed on a transparent film of polyethylene terephthalate and a lower electrode sheet having a lower transparent electrode formed on a transparent film of polycarbonate are arranged opposite to each other via a plurality of spacers of an insulating substance between the upper and lower electrodes, while a transparent hold plate of a polycarbonate plate is bonded over an entire face to a lower face of the lower electrode sheet via a transparent adhesion layer.

According to a second aspect of the present invention, there is provided the touch panel according to the first aspect which uses a polycarbonate film of a thickness of 50–300 μm for the transparent film of the lower electrode sheet.

According to a third aspect of the present invention, there is provided the touch panel according to the first or second aspect the transparent hold plate of which is a polycarbonate plate of a thickness of 0.5–3.0 mm having a rigidity for protecting a screen of a display apparatus from pressing at the input time.

According to a fourth aspect of the present invention, there is provided the touch panel according to any one of the first through third aspects in which the transparent adhesion layer is a transparent acrylic adhesive approximate in refractive index to the transparent film of the lower electrode sheet and the transparent hold plate.

According to a fifth aspect of the present invention, there is provided the touch panel in any one of the first through fourth aspects which uses a polycarbonate film of a thickness of 50–300 μm for the film of the lower electrode sheet, with the transparent adhesion layer being adapted to keep an elastic modulus of $5 \times 10^5 – 5 \times 10^7$ dynes/cm$^2$ at ordinary temperatures.

According to a sixth aspect of the present invention, there is provided the touch panel according to any one of the first through fifth aspects which is arranged on a screen of a display apparatus to enable position input when pressed from above by a finger or pen in accordance with instructions on the seen-through screen.

BRIEF DESCRIPTION OF DRAWINGS

These and other aspects and features of the present invention will become clear from the following description taken in conjunction with the preferred embodiment thereof with reference to the accompanying drawings, in which.

BEST MODE FOR CARRYING OUT THE INVENTION

Figure 1:
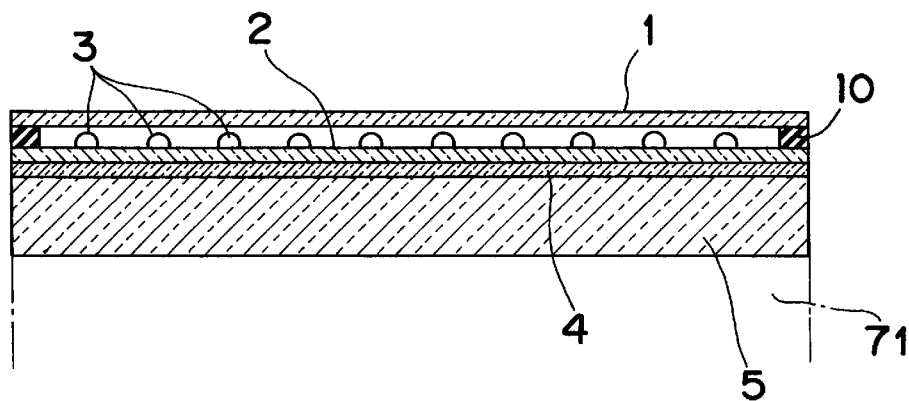
FIG. 1 is a partial sectional view showing the basic constitution of a touch panel according to a first embodiment of the present invention.

Before the description of the present invention proceeds, it is to be noted that like parts are designated by like reference numerals throughout the accompanying drawings.

An embodiment of the present invention will be described in detail below with reference to the drawings.

FIG. 1 shows the basic constitution of a touch panel according to one embodiment of the present invention. An upper electrode sheet 1 with an upper transparent electrode is arranged on a transparent film, while a lower electrode sheet 2 with a lower transparent electrode is arranged on a different transparent film. The electrode sheets 1, 2 are set to be opposite to each other via a plurality of spacers 3 of an insulating substance between the upper and lower electrodes. A transparent hold plate 5 of a resin is wholly bonded to a lower face of the lower electrode sheet 2 via a transparent adhesion layer 4.

Figure 2:
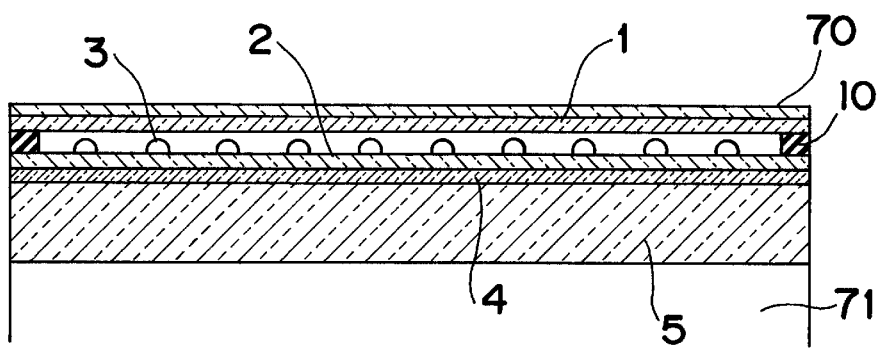
FIG. 2 is a partial sectional view of the touch panel of FIG. 1 in a state provided with a hard coat layer and arranged on a display apparatus.

A polyethylene terephthalate film is used for the transparent film of the upper electrode sheet 1, which has a thickness of 100–200 µm with a superior flexibility for pressing operation at an input time. As shown in FIG. 2, a hard coat layer 70 of a thermosetting type resin such as an acryl epoxy resin or an urethane resin, a photosetting type resin such as an acrylate resin, or the like may be set to a face of the upper electrode sheet 1 opposite to the face where the upper transparent electrode thereof is provided. The transparent film of the upper electrode sheet 1 is obtained by continuously forming the upper transparent electrodes to a roll of film material and then cutting to a size of the upper electrode sheet 1.

For the transparent film of the lower electrode sheet 2 is used a polycarbonate film of a thickness of 50–300 µm to be different in material from the transparent film of the upper electrode sheet 1. The transparent film of the lower electrode sheet 2 is of the equal material to the transparent hold plate 5. Therefore, even in the case where the touch panel is exposed to severe temperature and humidity environments, for instance, at a high temperature of 70° C., at a low temperature of −20° C., at a high temperature and a high humidity of 60° C. and 90% R/H, or the like, the transparent hold plate 5 hardly differs in size change between the side of the lower electrode sheet 2 and the opposite side, thus almost eliminating a warp from the touch panel. In addition, the polycarbonate film has a higher transmittance than the polyethylene terephthalate film of an equal thickness, thus improving a visibility of the touch panel in comparison with the case where the polyethylene terephthalate film is used for the transparent film of the lower electrode sheet 2. The transparent film of the lower electrode sheet 2 is obtained by continuously forming the transparent electrodes to a roll of film material and then cutting to a size of the lower electrode sheet 2. A thickness of the transparent film of the lower electrode sheet 2 is consequently limited to the above range.

Each transparent electrode set to opposing faces of the upper electrode sheet 1 and the lower electrode sheet 2 is formed by vacuum vapor deposition, sputtering, ion plating or the like to a metallic film or metallic oxide film with transparency and conductivity. For example, the metallic oxide film of ITO, tin oxide, indium oxide, antimony oxide, zinc oxide, cadmium oxide, or the like; a composite film essentially consisting of these metallic oxides; or the metallic film of gold, silver, copper, tin, nickel, aluminum, palladium or the like can be used. A thickness of each transparent electrode is generally 100–1000 Å.

The spacer 3 is formed in an optional shape onto a surface of the transparent electrode of either the upper electrode sheet 1 or the lower electrode sheet 2. A photoprocess with use of an acrylate resin such as melamine acrylate resin, urethane acrylate resin, epoxy acrylate resin, methacryl acrylate resin, acryl acrylate resin, or the like; or a transparent photosetting type resin such as polyvinyl alcohol resin or the like is employed as a way of forming the spacers 3. The spacers 3 can be formed also by a printing method with use of an urethane-based transparent resin. In general, the spacers 3 are formed like dots each having a diameter of 30–100 µm and a height of 1–15 µm and arranged with a constant interval of 0.1–10 µmm.

For the transparent hold plate 5, a polycarbonate plate of a thickness of 0.5–3.0 mm is used which has a superior rigidity for protecting a screen of a display apparatus 71 (The display apparatus 71 is indicated by chain lines in FIG. 1 and by solid lines in FIG. 2) such as an LCD or the like from being pressed at the input time. If the thickness is smaller than 0.5 mm, the plate cannot function as the hold plate 5. If the thickness exceeds 3.0 mm, the plate is too thick and too heavy to place on the screen, resulting in an impractical touch panel.

Figure 3:
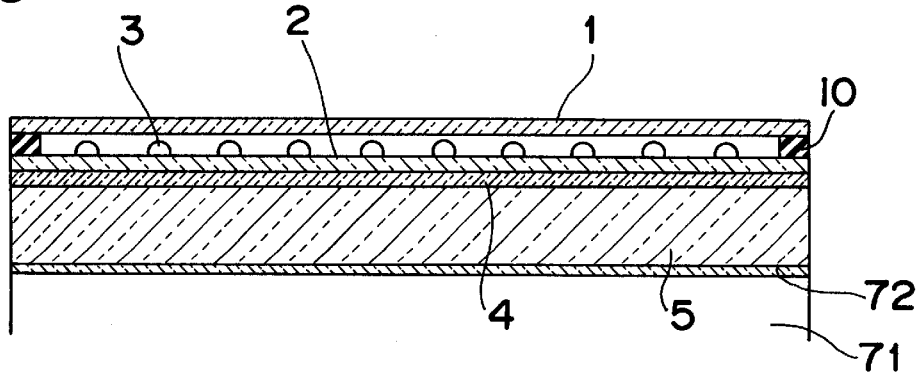
FIG. 3 is a partial sectional view of the touch panel of FIG. 1 in a state provided with a low reflection treatment layer and arranged on a display apparatus.
Figure 4:
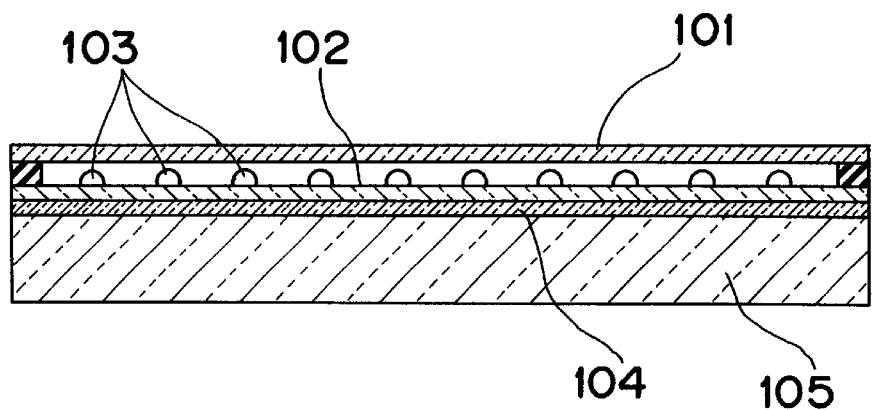
FIG. 4 is a diagram indicating the basic constitution of a general touch panel.
Figure 5:
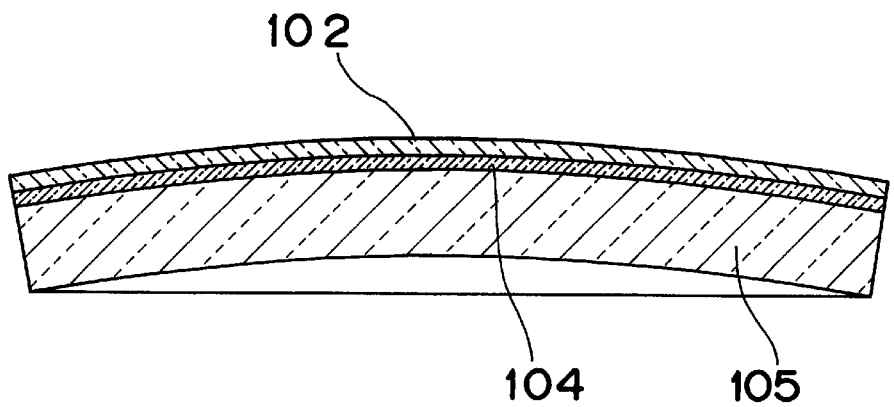
FIG. 5 is a diagram indicative of a warp of the touch panel.

To a lower face of the transparent hold plate 5 may be provided a low reflection treatment layer 72 subjected to a low reflection treatment, as shown in FIG. 3. For forming the low reflection treatment layer 72, a low reflection material using a low refractive index resin such as a fluororesin, a silicon resin or the like is applied, a multilayer film of metal is formed, or the like treatment is carried out. Alternatively, the treatment may be executed to the lower face of the transparent hold plate 5 directly. The presence of the low reflection treatment layer 72 restricts reflection at the lower face of the transparent hold plate, with improving the transmittance (visibility) of the touch panel.

While the upper electrode sheet 1 and the lower electrode sheet 2 are bonded outside an area of a display face by an adhesive 10 or a double-faced tape, the lower electrode sheet 2 and the transparent hold plate 5 are bonded at entire faces via the transparent adhesion layer 4. In this arrangement, no air layer is present between the lower electrode sheet 2 and the transparent hold plate 5, so that an extra deflection to the upper electrode sheet 1 at the input time is prevented and a sense of touch and operation is prevented from being dull, with no attenuation of light at a boundary to the air layer. For the transparent adhesion layer 4, a transparent adhesive such as an acrylic adhesive can be used which is generally used to totally bond the lower electrode sheet 2 and the transparent hold plate 5. For the transparent adhesion layer 4, one that has a refractive index approximate to that of the transparent film of the lower electrode sheet 2 and the transparent hold plate 5 is more preferred, and also one that has an elastic modulus of $5 \times 10^5$–$5 \times 10^7$ dynes/cm$^2$ at ordinary temperatures is preferred. When the transparent adhesion layer 4 is thus adapted to keep an elastic modulus in a range of $5 \times 10^5$–$5 \times 10^7$ dynes/cm$^2$ at ordinary temperatures, the touch panel is almost prevented from warping and consequently the upper transparent electrode of the touch panel can be improved in durability against sliding. The durability against sliding is vital to the touch panel. For forming the transparent adhesion layer 4, the adhesive may be directly applied to the lower electrode sheet 2 or the transparent hold plate 5. Otherwise, a double-faced adhesive film with an adhesive applied to both faces of a thin transparent supporting film may be formed beforehand and bonded to the lower electrode sheet 2 or the transparent hold plate 5 to form the transparent adhesion layer 4. From a view point of the transmittance, a double-faced tape without an adhesive or a base (supporting film) is preferable as the transparent adhesion layer 4. On the other hand, from a view point of preventing the warp, the presence of the supporting film does not impair the warp prevention function because the transparent adhesion layer 4 is held between the polycarbonate sheet of the lower electrode sheet 2 and the polycarbonate plate of the transparent hold plate 5.

Working example

A transparent electrode of ITO or the like is set in a thickness of 200 Å by sputtering to one face of a roll of polyethylene terephthalate film of a thickness of 200 μm. The film is then cut to a rectangle of a length of 89 mm and a breadth of 68 mm, whereby an upper electrode sheet is formed.

Meanwhile, a transparent electrode of ITO or the like is formed in a thickness of 200 Å by sputtering to one face of a 100 μm-thick polycarbonate film of a roll. Then, the film is cut to a rectangle of a length of 89 mm and a breadth of 68 mm to form a lower electrode sheet. A urethane-based transparent resin is printed in dots on the transparent electrode of the lower electrode sheet, whereby spacers each having a diameter 50 μm and a height of 10 μm are arranged with an interval of 1 mm. With respective electrode faces set opposite to each other, the upper electrode sheet and the lower electrode sheet are bonded by an acrylic adhesive (elastic modulus of $8\times10^5$ dynes/cm$^2$) of a thickness of 20 μm and a breadth of 5 mm outside an area of a display face.

On the other hand, a low reflection material using a silicon-based resin is applied to one face of a transparent hold plate of a polycarbonate plate of a length 89 mm, a breadth 68 mm, and a thickness 1 mm, that is, a low reflection treatment is executed to form a low reflection treatment layer.

Finally, a transparent adhesion layer of an acrylic adhesive is applied and formed to a face of the transparent hold plate opposite to the face having the low reflection treatment layer, and bonded totally to a lower face of the lower electrode sheet. A touch panel is obtained in this manner.

The touch panel is left for 240 hours under an environment of a temperature 60° C. and a humidity 90% RH, and further left for 24 hours at a room temperature. A warp is measured thereafter. No warp is brought about to the touch panel.

A comparison example uses a 200 μm-thick polyethylene terephthalate film for a transparent film of a lower electrode sheet, which is subjected to an environmental test similar to the working example. A central part of the touch panel warps to project up by 1.2 mm.

A character slide test is conducted to the working example. The characters of the Japanese katakana syllabary are input with a load 250 gf by a polyacetal pen having a leading end of a radius 0.8 R. A contact resistance (ON resistance) is measured after 200000 characters are sliding-input. Since the arrangement having the lower electrode sheet, the transparent adhesive layer, and the transparent hold plate has a buffer effect, the contact resistance does not increase even after the input, specifically, 0.5 k Ω before the input and 0.5 k Ω after the input. An improvement in slide durability of the upper transparent electrode is detected.

In contrast to the above, a character slide test similar to the working example is carried out to another comparison example which uses the lower electrode sheet, the transparent adhesive layer, and a 1.1 mm-thick soda-lime glass plate in place of the transparent hold plate. After 100000 characters are sliding-input, a contact resistance (ON resistance) increases from 1.0 k Ω before the input up to 2.0 k Ω after the input. The upper transparent electrode is deteriorated.

The touch panel according to the present invention in the constitution and operation as above exerts effects to be described below.

Specifically, since the polycarbonate film which is the same material as a plate material for the transparent hold plate is used for the transparent film of the lower electrode sheet, the transparent hold plate hardly generates a difference in size change between the side of the lower electrode sheet and the opposite side even when the touch panel is exposed to a severe temperature environment or humidity environment, and thus, the touch panel hardly warps.

When a 50–300 μm-thick polycarbonate film is used for the transparent film of the lower electrode sheet, the transparent film of the lower electrode sheet can be obtained by forming transparent electrodes continuously to the rolled film material and then cutting to a size of the lower electrode sheet.

When the transparent hold plate is formed of a 0.5–3.0 mm-thick polycarbonate sheet having a rigidity for protecting a screen of a display apparatus from pressing at the input time, the touch panel is almost prevented from being deflected into touch with the display screen at the input time. If the touch panel were accidentally brought in touch with the display screen to cause the display apparatus to blur when the display apparatus is an LCD, the present invention can prevent such generation of blur.

Furthermore, when the transparent adhesion layer uses a transparent acrylic adhesive having a refractive index approximate to that of the transparent film of the lower electrode sheet and the transparent hold plate, the light is hardly reflected between the adhesion layer and the hold plate and between the lower electrode sheet and the adhesion layer, whereby the visibility is improved.

When a soft polycarbonate film of a thickness 50–300 μm is used for the film of the lower electrode sheet and the transparent adhesion layer is adapted to have an elastic modulus of $5\times10^5$–$5\times10^7$ dynes/cm$^2$ at ordinary temperatures, the touch panel hardly warps with the slide durability of the upper transparent electrode of the touch panel being improved. The slide durability is considerably important to the touch panel.

When the touch panel is arranged on a screen of a display apparatus to enable position input when pressed from above by a finger or pen in accordance with instructions on the see-through screen, the touch panel can be superior both in flexibility for pressing at the input time and in rigidity for protecting the screen of the display apparatus such as an LCD, a CRT, or the like from pressing at the input time. Also the touch panel hardly warps even when exposed to a severe temperature environment or humidity environment and is prevented from being worsened in appearance, thus preventing the screen from being decreased in visibility. A sense of input of the touch panel can be prevented from varying because of generation of the warp.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A touch panel comprising:
   an upper electrode sheet comprising a transparent polyethylene terephthalate film and an upper electrode formed on said transparent polyethylene terephthalate film;
   a lower electrode sheet comprising a transparent polycarbonate film and a lower transparent electrode formed on said transparent polycarbonate film;
   a plurality of spacers comprising an insulating substance disposed between said upper electrode sheet and said lower electrode sheet;

a transparent polycarbonate hold plate; and a transparent adhesion layer disposed between said lower electrode sheet and said transparent hold plate, said transparent adhesion layer bonding said transparent polycarbonate hold plate over an entire lower face of said lower electrode sheet.

2. A touch panel according to claim 1, wherein said polycarbonate film of said lower electrode sheet has a thickness of 50–300 μm.

3. A touch panel according to claim 2, wherein said transparent polycarbonate hold plate has a thickness of 0.5–3.0 mm and has a rigidity capable of protecting a screen of a display apparatus from being pressed when said touch panel is pressed.

4. A touch panel according to claim 3, wherein said transparent adhesion layer comprises a transparent acrylic adhesive having a refractive index that is approximately equal to a refractive index of said polycarbonate film of said lower electrode sheet and a refractive index of said transparent polycarbonate hold plate.

5. A touch panel according to claim 2, wherein said transparent adhesion layer comprises a transparent acrylic adhesive having a refractive index that is approximately equal to a refractive index of said polycarbonate film of said lower electrode sheet and a refractive index of said transparent polycarbonate hold plate.

6. A touch panel according to claim 2, wherein said transparent polycarbonate film has a thickness of 50–300 μm, and wherein said transparent adhesion layer is adapted to keep an elastic modulus of $5 \times 10^5$–$5 \times 10^7$ dynes/cm$^2$ at ordinary temperatures.

7. A touch panel according to claim 1, wherein said transparent hold plate has a thickness of 0.5–3.0 mm and has a rigidity capable of protecting a screen of a display apparatus from being pressed when said touch panel is pressed.

8. A touch panel according to claim 7, wherein said transparent adhesion layer comprises a transparent acrylic adhesive having a refractive index that is approximately equal to a refractive index of said polycarbonate film of said lower electrode sheet and a refractive index of said transparent polycarbonate hold plate.

9. A touch panel according to claim 7, wherein said transparent polycarbonate film has a thickness of 50–300 μm, and wherein said transparent adhesion layer is adapted to keep an elastic modulus of $5 \times 10^5$–$5 \times 10^7$ dynes/cm$^2$ at ordinary temperatures.

10. A touch panel according to claim 1, wherein said transparent adhesion layer comprises a transparent acrylic adhesive having a refractive index that is approximately equal to a refractive index of said transparent polycarbonate film of said lower electrode sheet and a refractive index of said transparent polycarbonate hold plate.

11. A touch panel according to claim 10, wherein said transparent polycarbonate film has a thickness of 50–300 μm, and wherein said transparent adhesion layer is adapted to keep an elastic modulus of $5 \times 10^5$–$5 \times 10^7$ dynes/cm$^2$ at ordinary temperatures.

12. A touch panel according to claim 1, wherein said transparent polycarbonate film has a thickness of 50–300 μm, and wherein said transparent adhesion layer is adapted to keep an elastic modulus of $5 \times 10^5$–$5 \times 10^7$ dynes/cm$^2$ at ordinary temperatures.

13. A device comprising:

a touch panel comprising an upper electrode sheet, a lower electrode sheet, at least one spacer, a transparent polycarbonate hold plate and a transparent adhesion layer; and a display apparatus comprising a screen, wherein said upper electrode sheet comprises a transparent polyethylene terephthalate film and an upper electrode formed on said transparent polyethylene terephthalate film;

wherein said lower electrode sheet comprises a transparent polycarbonate film and a lower transparent electrode formed on said transparent polycarbonate film;

wherein each of said at least one spacer comprises an insulating substance disposed between said upper electrode sheet and said lower electrode sheet;

wherein said transparent adhesion layer is disposed between said lower electrode sheet and said transparent hold plate, wherein said transparent adhesion layer bonds said transparent polycarbonate hold plate over an entire lower face of said lower electrode sheet, and wherein said touch panel is arranged on said screen so as to enable position input when said touch panel is pressed by a finger or pen.

14. A device according to claim 13, wherein said polycarbonate film of said lower electrode sheet has a thickness of 50–300 μm.

15. A device according to claim 13, wherein said transparent hold plate has a thickness of 0.5–3.0 mm and has a rigidity capable of protecting a screen of a display apparatus from being pressed when said touch panel is pressed.

16. A device according to claim 13, wherein said transparent adhesion layer comprises a transparent acrylic adhesive having a refractive index that is approximately equal to a refractive index of said transparent polycarbonate film of said lower electrode sheet and a refractive index of said transparent polycarbonate hold plate.

17. A device according to claim 13, wherein said transparent polycarbonate film has a thickness of 50–300 μm, and wherein said transparent adhesion layer is adapted to keep an elastic modulus of $5 \times 10^5$–$5 \times 10^7$ dynes/cm$^2$ at ordinary temperatures.

18. A touch panel comprising:

an upper electrode sheet comprising a transparent polyethylene terephthalate film and an upper electrode formed on said transparent polyethylene terephthalate film;

a lower electrode sheet comprising a transparent polycarbonate film and a lower transparent electrode formed on said transparent polycarbonate film;

at least one spacer comprising an insulating substance disposed between said upper electrode sheet and said lower electrode sheet;

a transparent polycarbonate hold plate; and a transparent adhesion layer disposed between said lower electrode sheet and said transparent hold plate, said transparent adhesion layer bonding said transparent polycarbonate hold plate over an entire lower face of said lower electrode sheet, wherein said transparent polycarbonate film comprises a first polycarbonate material capable of changing size, based on a temperature or humidity of an environment, when said touch panel is disposed in the environment, and wherein said transparent polycarbonate hold plate comprises a second polycarbonate material capable of changing size, based on the temperature or humidity of the environment, in an amount substantially equal to the amount of size change of said transparent polycarbonate film, when said touch panel is disposed in the environment.

19. A touch panel according to claim 18, wherein said polycarbonate film of said lower electrode sheet has a thickness of 50–300 $\mu$m.

20. A touch panel according to claim 19, wherein said transparent polycarbonate hold plate has a thickness of 0.5–3.0 mm and has a rigidity capable of protecting a screen of a display apparatus from being pressed when said touch panel is pressed.

21. A touch panel according to claim 20, wherein said transparent adhesion layer comprises a transparent acrylic adhesive having a refractive index that is approximately equal to a refractive index of said polycarbonate film of said lower electrode sheet and a refractive index of said transparent polycarbonate hold plate.

22. A touch panel according to claim 19, wherein said transparent adhesion layer comprises a transparent acrylic adhesive having a refractive index that is approximately equal to a refractive index of said polycarbonate film of said lower electrode sheet and a refractive index of said transparent polycarbonate hold plate.

23. A touch panel according to claim 19, wherein said transparent polycarbonate film has a thickness of 50–300 $\mu$m, and wherein said transparent adhesion layer is adapted to keep an elastic modulus of $5 \times 10^5$–$5 \times 10^7$ dynes/cm$^2$ at ordinary temperatures.

24. A touch panel according to claim 18, wherein said transparent hold plate has a thickness of 0.5–3.0 mm and has a rigidity capable of protecting a screen of a display apparatus from being pressed when said touch panel is pressed.

25. A touch panel according to claim 24, wherein said transparent adhesion layer comprises a transparent acrylic adhesive having a refractive index that is approximately equal to a refractive index of said polycarbonate film of said lower electrode sheet and a refractive index of said transparent polycarbonate hold plate.

26. A touch panel according to claim 24, wherein said transparent polycarbonate film has a thickness of 50–300 $\mu$m, and wherein said transparent adhesion layer is adapted to keep an elastic modulus of $5 \times 10^5$–$5 \times 10^7$ dynes/cm$^2$ at ordinary temperatures.

27. A touch panel according to claim 18, wherein said transparent adhesion layer comprises a transparent acrylic adhesive having a refractive index that is approximately equal to a refractive index of said transparent polycarbonate film of said lower electrode sheet and a refractive index of said transparent polycarbonate hold plate.

28. A touch panel according to claim 27, wherein said transparent polycarbonate film has a thickness of 50–300 $\mu$m, and wherein said transparent adhesion layer is adapted to keep an elastic modulus of $5 \times 10^5$–$5 \times 10^7$ dynes/cm$^2$ at ordinary temperatures.

29. A touch panel according to claim 18, wherein said transparent polycarbonate film has a thickness of 50–300 $\mu$m, and wherein said transparent adhesion layer is adapted to keep an elastic modulus of $5 \times 10^5$–$5 \times 10^7$ dynes/cm$^2$ at ordinary temperatures.

\* \* \* \* \*